(12) United States Patent
Hubinois et al.

(10) Patent No.: US 7,492,454 B2
(45) Date of Patent: Feb. 17, 2009

(54) ACHROMATIC AND ABSORPTION REDUCING LIGHT COLLECTING SYSTEM, PARTICULARLY ADAPTED TO OPTICAL SPECTROMETRIC ANALYSIS

(75) Inventors: Jean-Charles Hubinois, Dijon (FR); Vincent Lavoine, Bussy le Grand (FR); Hervé Chollet, Dijon (FR)

(73) Assignee: Commissariat a l'Energie Atomique, Paris (FR)

( * ) Notice: Subject to any disclaimer, the term of this patent is extended or adjusted under 35 U.S.C. 154(b) by 36 days.

(21) Appl. No.: 10/530,608

(22) PCT Filed: Oct. 7, 2003

(86) PCT No.: PCT/FR03/02947

§ 371 (c)(1),
(2), (4) Date: Jan. 18, 2006

(87) PCT Pub. No.: WO2004/034119

PCT Pub. Date: Apr. 22, 2004

(65) Prior Publication Data

US 2006/0109571 A1 May 25, 2006

(30) Foreign Application Priority Data

Oct. 8, 2002 (FR) .................................. 02 12467

(51) Int. Cl.
*G02B 17/06* (2006.01)
*G01J 3/28* (2006.01)

(52) U.S. Cl. .................... 356/326; 356/51; 250/372; 359/351; 359/858

(58) Field of Classification Search .................. 356/51, 356/326, 328; 250/272, 273, 372, 373; 359/351, 359/858, 859
See application file for complete search history.

(56) References Cited

U.S. PATENT DOCUMENTS

| | | | |
|---|---|---|---|
| 2,218,270 A * | 10/1940 | Snook | 359/365 |
| 3,460,892 A | 8/1969 | Flushing | |
| 3,540,825 A | 11/1970 | Grojean | |
| 3,641,350 A | 2/1972 | Petropoulas et al. | |
| 3,958,882 A | 5/1976 | Gast | |
| 3,983,385 A * | 9/1976 | Troue | 422/186.3 |
| 4,977,349 A * | 12/1990 | Asakura et al. | 313/490 |
| 4,988,858 A | 1/1991 | Pinson | |
| 5,107,526 A | 4/1992 | Hoover | |
| 5,452,085 A | 9/1995 | Fancy et al. | |
| 5,550,375 A | 8/1996 | Peters et al. | |
| 5,867,329 A | 2/1999 | Justus et al. | |

FOREIGN PATENT DOCUMENTS

| | | |
|---|---|---|
| DE | 44 34 814 A1 | 4/1996 |
| EP | 0 780 669 A1 | 6/1997 |
| GB | 941813 | 8/1961 |

\* cited by examiner

*Primary Examiner*—F. L Evans
(74) *Attorney, Agent, or Firm*—Nixon Peabody LLP

(57) ABSTRACT

This system collects light emitted by at least one light source (52) and focuses it onto at least one light detection device (54). Preferably, it comprises a first mirror (58) that collects light emitted by the source and focuses it on a second mirror (60) that focuses it in turn onto the device. The system is provided with a chamber that is opaque to all light, particularly ultraviolet radiation, and in which the light source, the light detection device and the mirrors are placed, and means of creating a vacuum in this chamber and filling it with a gas that is transparent to ultraviolet radiation.

10 Claims, 7 Drawing Sheets

ACHROMATIC AND ABSORPTION REDUCING LIGHT COLLECTING SYSTEM, PARTICULARLY ADAPTED TO OPTICAL SPECTROMETRIC ANALYSIS

CROSS-REFERENCE TO RELATED APPLICATION

This application claims priority based on International Patent Application No. PCT/FR2003/002947, entitled "Achromatic and Absorption Reducing Light Collecting System, Particularly Adapted to Optical Spectrometric Analysis" by Jean-Charles HUBINOIS, Vincent LAVOINE, and Herve CHOLLET, which claims priority of French Application No. 02 12467, filed on Oct. 8, 2002, and which was not published in English.

DESCRIPTION

1. Technical Domain

The present invention relates to a light collection system. It is particularly applicable to optical spectrometric analysis.

More particularly, this invention relates to a combination of mirrors with different technical characteristics, in the optical paths domain.

These mirrors are associated with each other in a particular system that forms an optical system to collect light from a light source and to send it to a light detection device that can be used at least in the field of optical spectrometric analysis, and possibly in other optical applications.

FIG. 1 diagrammatically shows a light collection system 2 placed between a light source 4 and a light detection system 6 through which there is a light entry slit 8. The light path is marked with reference 10.

2. State of Prior Art

At the present time, optical collection systems used depend on:

the nature of the incident light, in other words the wavelengths of the light radiation making up this incident light, the distance separating the light source from the detection device, and the dimensions and shape of the light source and the detection device.

There are various optical systems adapted to a polychromatic light source for which the size varies from a few millimeters to a few tens of millimeters and that is located at a distance from the detection device varying from a few millimeters to several tens of centimeters.

For example, for a detection device in which light can only penetrate through a small slit called an "entry slit" a few millimeters long and a few micrometers wide, existing light transmission and collection systems are composed either of a plate with parallel faces, or a plane-convex or biconvex focusing lens, or a set of two plane-convex focusing lenses.

FIG. 2 shows the path 12 of light in the case of a light transmission system composed of a plate with parallel faces 14. References 16, 18, 20, 22 and 23 respectively show the light source, the detection device, the entry slit of the latter, the path of light and the light beam that enters the detection device.

FIG. 3 shows the path 24 of light in the case of a light collection system composed of a biconvex focussing lens 26.

FIG. 4 shows the path 28 of light in the case of a light collection system composed of a set of two plane-convex focussing lenses 30 and 32.

The system in FIG. 2 transmits light without focussing it, in other words without amplifying the light flux. The systems in FIGS. 3 and 4 collect a maximum amount of light from source 16 before focussing it, in other words concentrating this light on the entry slot 20 of the detection device 18 by amplifying the light flux. If the light collection system is further from the detection device than the light source, the system that uses a set of lenses (FIG. 4) makes it possible to transmit light according to a substantially parallel beam between the two lenses 30 and 32 and therefore to minimize risks of poor focussing on the entry slit 20.

Although the light collection systems in FIGS. 3 and 4 amplify the light fluxes, these systems have the following disadvantages.

1) They do not enable optimum transmission of light. The optical elements (plate with parallel faces or lenses) absorb light radiation to a variable extent depending on the wavelength of the radiation.

This absorption is sometimes negligible, particularly in the case of visible light for example passing through a magnesium fluoride lens. This absorption is often greater for radiation in the far ultraviolet (corresponding to wavelengths of less than 200 nm).

For example, in the case of a 120 nm wavelength radiation, about 80% of the incident light flux is absorbed by a 1.4 mm thick magnesium fluoride lens. Similarly, absorption may be high above 800 nm (infrared range).

2) They are incapable of focussing all radiation with different wavelengths making up polychromatic light at a single point due to the presence of chromatic aberrations, particularly longitudinal chromatic aberrations. The consequence of these chromatic aberrations is dispersion of focussing points along the optical axis, as a function of the wavelength of the radiation.

This phenomenon is due to variations in the refraction index of the material from which the light collection system is made as a function of the wavelength of the incident light. The formation of longitudinal chromatic aberrations for polychromatic light passing through a lens 34 made of magnesium fluoride is shown for example in FIG. 5.

In FIG. 5, the reference 36 represents polychromatic incident light, reference 38 represents the focal point of light with the shortest wavelength, reference 40 represents the focal point of light with the longest wavelength, reference 42 represents the detection device, reference 44 represents the entry slit of this detection device, reference 46 represents the image spot for the shortest wavelength and reference 48 represents the image spot for the longest wavelength.

FIG. 5 shows the partial closing that occurs as a result at the entry slit.

This problem of a different focal point depending on the wavelength is particularly severe when the range of observed wavelengths is wide and induces a difference in the sensitivity of the detection device as a function of the wavelengths.

As an example, for two light radiations with different wavelengths, the light flux at a given position on the optical axis is different for each wavelength. It may be maximum if the entry slit is placed on the focal point of one of the two wavelengths, but it is necessarily lower for the second wavelength.

In summary, although known light collection systems comprising focussing lenses partly satisfy light flux amplification needs, they do not make it possible to maximise this amplification simultaneously for all wavelengths of polychromatic light.

This is firstly due to the sometimes severe absorption of light induced by the material from which the lens is made, and secondly to longitudinal chromatic aberrations (differences between positions of light flux maxima on the optical axis).

It may also be necessary to study one or more polychromatic light sources, particularly one or more sources for which the spectrum contains one or more ultraviolet components. There is then the need to detect light emitted by such sources after this light has been collected and focussed on a detection system.

However, known light collection systems do not include any means of minimising the absorption of ultraviolet radiation on its path from the light source(s) as far as the detection device, while achromatically amplifying the light flux at a point and preventing the detection device from receiving ultraviolet radiation from sources other than the source(s) being studied.

PRESENTATION OF THE INVENTION

The purpose of this invention is to correct the disadvantages mentioned above.

Its purpose is an optical system that can solve light absorption problems and chromatic aberration problems while satisfying needs for amplification of light flux (of all natures and wavelengths) between one or more light sources and one or more detection devices.

Specifically, the purpose of this invention is a light collection system, this system being intended to collect light emitted by at least one light source and to focus the collected light onto at least one light detection device, this system being characterised in that it comprises at least two mirrors, namely a first mirror and a second mirror, the first mirror being capable of collecting light emitted by the light source and focusing the collected light on the second mirror, this second mirror being capable of focusing the light that it receives from the first mirror on the light detection device, this system being amplifying and achromatic and having a low absorption, particularly in the ultraviolet, and in that the system is provided with:

- a chamber that is opaque to all light, particularly ultraviolet radiation, and in which the light source, the light detection device and the mirrors are placed, and
- means of creating a vacuum in this chamber or filling it with a gas that is transparent to ultraviolet radiation.

The light detection device may or may not comprise an entry slit.

According to a first particular embodiment of the system according to the invention, the first and second mirrors have the same axis, this axis forming the optical axis of the system, and the respective focal points of the first and second mirrors are located on this optical axis.

These respective focal points for the first and second mirrors may be coincident, or they may be distinct.

In the case of this first particular embodiment, the first mirror may comprise a central drilling that is capable of allowing light focussed by the second mirror to pass towards the light detection device.

According to a second particular embodiment, the first and second mirrors are offset from each other, at least one of the first and second mirrors being off axis.

Each of the first and second mirrors may be chosen from among spherical mirrors, parabolic mirrors and ellipsoidal mirrors.

Each of the first and second mirrors may be covered by a metallic or chemical deposit.

The light detection device may comprise an entry slit and the second mirror is then designed to focus the light that it receives from the first mirror on this entry slit.

The light detection device may be an optical spectrometric analysis device comprising an entry slit and the second mirror is then designed to focus light that it receives from the first mirror on this entry slit.

The light source may be a polychromatic source.

Light emitted by this light source may contain one or more ultraviolet components.

This light source may be a luminescent discharge lamp.

BRIEF DESCRIPTION OF THE DRAWINGS

This invention will be better understood after reading the description of example embodiments given below purely for guidance and in no way limitative, with reference to the appended figures, wherein.

DETAILED PRESENTATION OF PARTICULAR EMBODIMENTS

An optical system according to the invention preferably uses two mirrors called the "first mirror" and "second mirror" respectively. The shapes and characteristics of these two mirrors are predefined and a metallic or chemical deposit may or may not be formed on these mirrors.

This metallic or chemical deposit is intended to protect the mirror on which it is formed, against possible mechanical or chemical aggression and to minimize absorption of light radiation.

The first mirror is designed to collect the maximum amount of light from the light source, after which the optical system is placed, and to focus light thus collected on the second mirror. This second mirror then focuses the light that it receives onto the light detection device that follows the optical system.

This device usually comprises an entry slit and the second mirror then focuses the light that it receives on this slit. In a preferred application of the invention, this device is an optical emission spectrometer that actually comprises such a slit.

The size of the mirrors depends on the power and size of the light source, the distance between this light source and the mirrors and the distance between these mirrors and the detection device, or more precisely the slit in this device.

The first and second mirrors are focusing, which makes it possible to amplify light fluxes.

Furthermore, the use of the first and second mirrors instead of lenses solves the light absorption problems mentioned above.

Chromatic aberration problems are solved by the use of mirrors that are inherently free of chromatic effects.

The first mirror used is preferably a spherical, parabolic or ellipsoidal mirror. The same is true for the second mirror.

Figure 6:
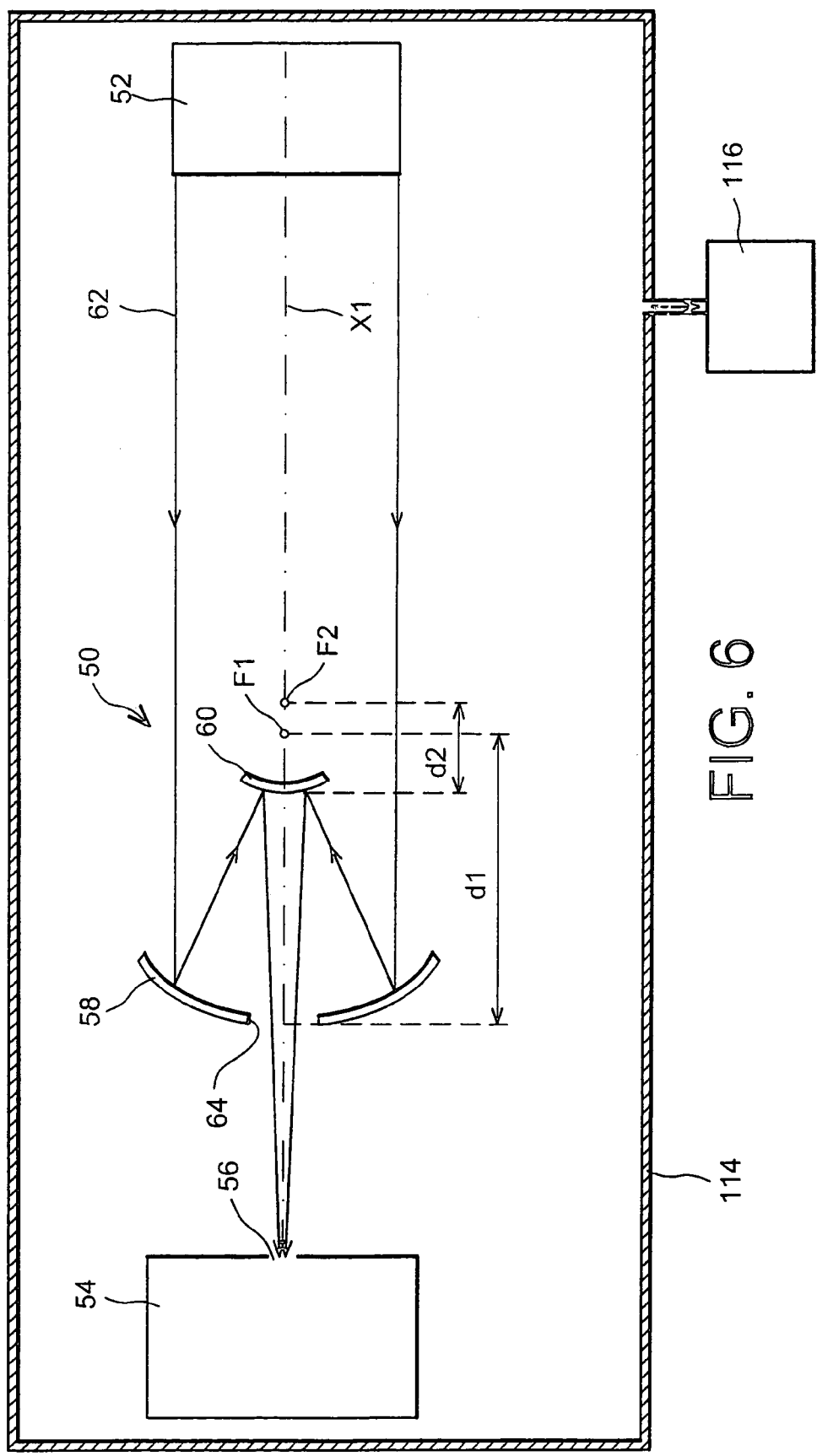
FIG. 6 is a diagrammatic view of a first particular embodiment of the optical system according to the invention using two mirrors placed on the optical axis, in the case of a light source that is large compared with these mirrors.
Figure 7:
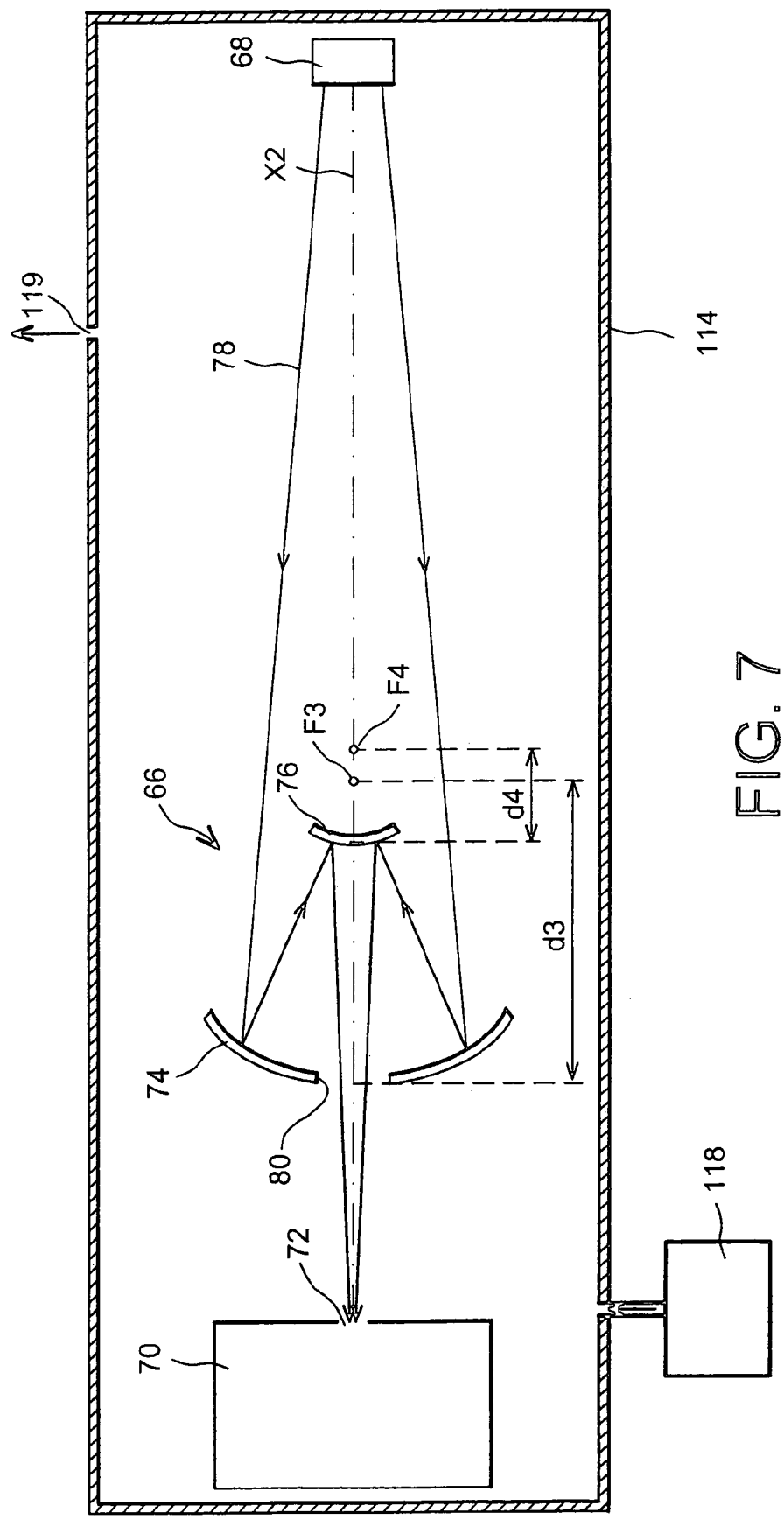
FIG. 7 is a diagrammatic view of a second particular embodiment of the optical system according to the invention using two mirrors placed on the optical axis, in the case of a light source that is small compared with these mirrors.
Figure 10:
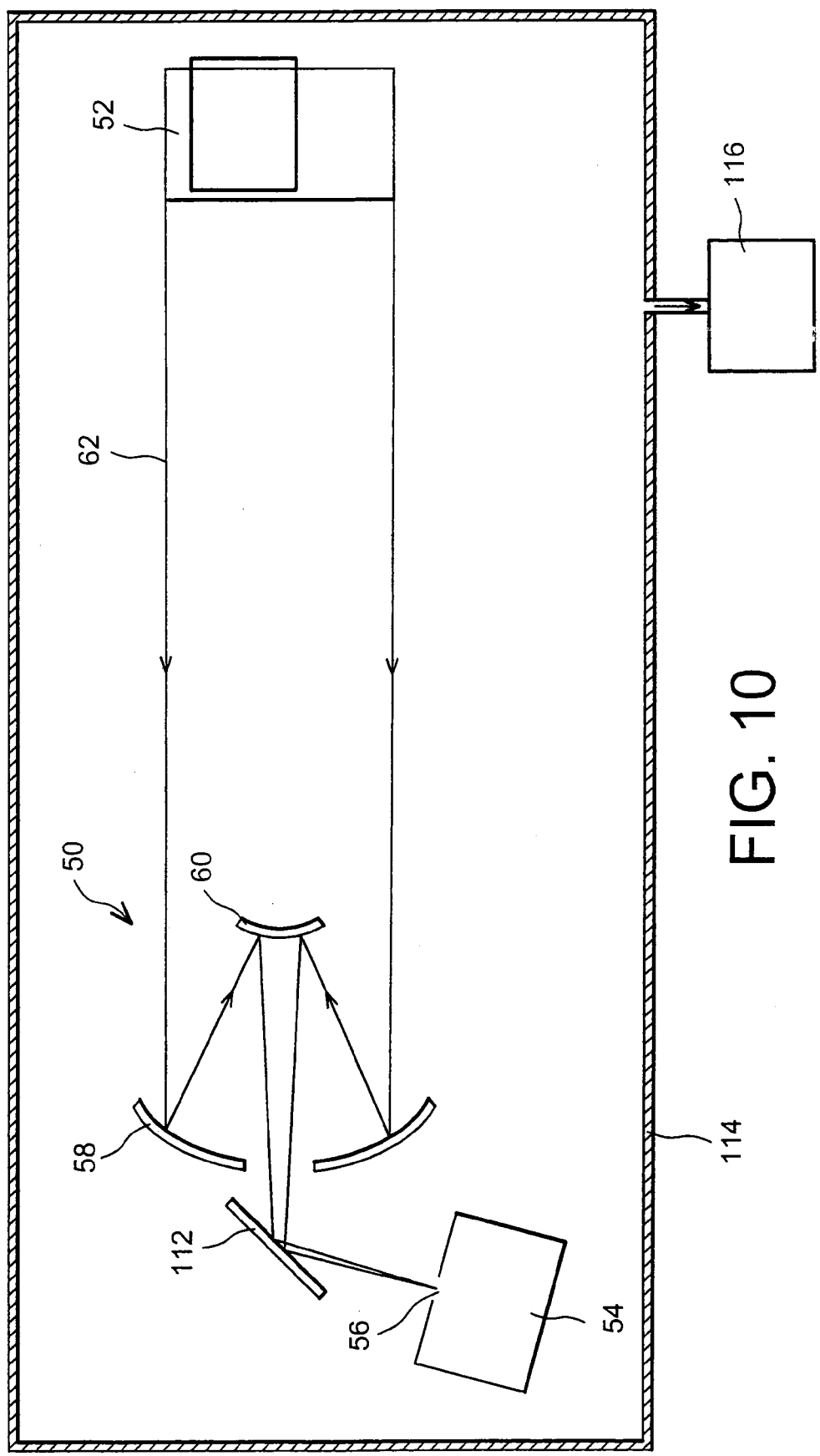
FIG. 10 shows a diagrammatic view of another system according to the invention using more than two mirrors.

When the two mirrors have the same axis and their respective focal points, or focussing points, are placed on this same axis that forms the optical axis of the system, there may be a hole in the first mirror to allow light to pass from the second mirror to the light detection device (case of examples in FIGS. 6, 7 and 10).

Figure 8:
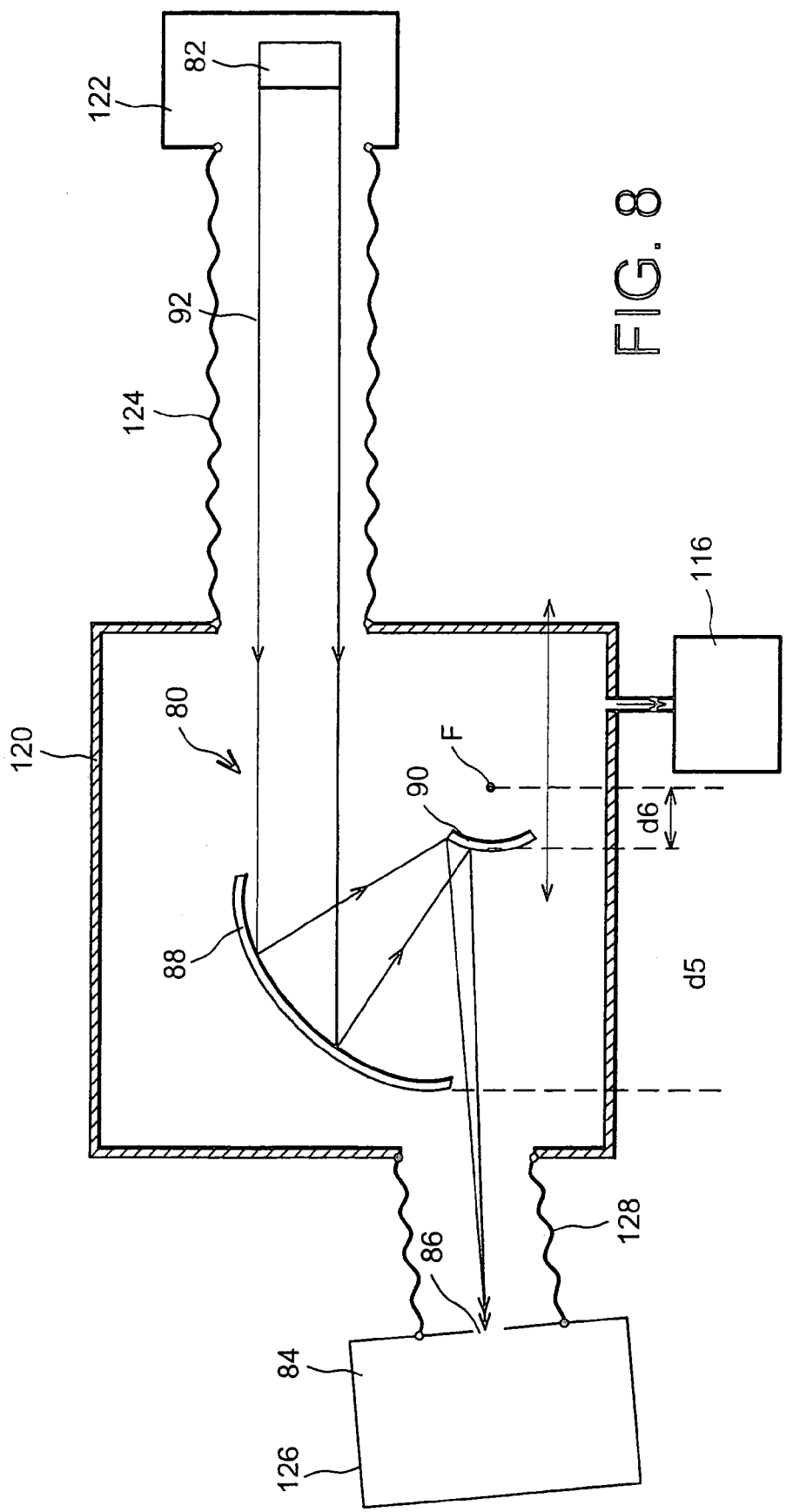
FIG. 8 is a diagrammatic view of a third particular embodiment of the optical system according to the invention, using two mirrors, at least one of which is off axis, FIG. 9 diagrammatically shows transmission of light in an installation comprising a luminescent discharge light source, a light collection system with mirrors according to the invention and a light detection device composed of an optical emission spectrometer.

There is no need for a hole to be drilled in the first mirror in the case in which the two mirrors are offset from each other to form an off axis setup (case of the example in FIG. 8).

We will now reconsider the examples in FIGS. 6 to 8.

The optical system 50 according to the invention that is diagrammatically shown in FIG. 6, is placed between a light source 52 and a light detection device 54 for which the entry slit is marked with reference 56.

The first mirror 58 of the system 50 is concave while the second mirror 60 of this system is convex. Light 62 emitted by the source 52 is picked up by the mirror 58 and focused by the latter to the mirror 60 that in turn focuses it on the slit 56.

In the example shown in FIG. 6, the size of the light source 52 is comparable to the size of the mirrors 58 and 60. However, it could be larger.

The optical axis of the system 50 is marked as reference X1. It can be seen that the mirror 58 is much larger than the mirror 60 and is located between this mirror and the device 54, and comprises a drilling 64 through which passes light that the mirror 60 focuses on the slit 56.

Furthermore, the mirrors 58 and 60 may for example be of the spherical type, and have the same axis that is coincident with the X1 axis and their respective focal points F1 and F2 are on this X1 axis. The focal distances of the mirrors 58 and 60 are denoted d1 and d2 respectively, where d1 is greater than d2. The focal points F1 and F2 are distinct in the example shown in FIG. 6, but they could be coincident in other examples.

The optical system 66 conform with the invention that is diagrammatically shown in FIG. 7, is placed between a light source 68 and a light detection device 70, for which the entry slit is marked as reference 72.

The first mirror 74 of the system 66 is concave while the second mirror 76 of this system is convex. Light 78 emitted by the source 68 is picked up by the mirror 74 and is focussed by the latter towards mirror 76 that in turn focuses it on the slit 72.

In the example shown in FIG. 7, the size of the light source 68 is small compared with the size of the mirrors 74 and 76. For example, it may be 16 times smaller.

The optical axis of the system 66 is marked with reference X2. It can be seen that the mirror 74 is much larger than the mirror 76, is located between the latter and the device 70 and it comprises a drilling 80 through which light passes that the mirror 76 focuses on the slit 72.

Furthermore, the mirrors 74 and 76 are for example of the spherical type, have the same axis that is coincident with the X2 axis and their respective focal points F3 and F4 are on this same X2 axis. The focal distances of the mirrors 74 and 76 are denoted d3 and d4 respectively, where d3 is greater than d4. The focal points F3 and F4 are distinct in the example in FIG. 7, but they could be coincident in other examples.

The optical system 80 according to the invention that is diagrammatically shown in FIG. 8, is located between a light source 82 and a light detection device 84, for which the entry slit is marked as reference 86.

The first mirror 88 of the system 80 is concave while the second mirror 90 of this system is convex. Light 92 emitted by the source 82 is picked up by the mirror 88 and is focused by the latter towards the mirror 90 that in turn focuses it onto the slit 86.

It can be seen that the mirror 88 is much larger than the mirror 90. The two mirrors 88 and 90 are offset from each other and are off axis with respect to the optical axis. Furthermore, the mirrors 74 and 76 are for example of the spherical type and their respective focal points are coincident at the same point F. The focal distances of the mirrors 74 and 76 are denoted d5 and d6 respectively, where d5 is greater than d6.

Thus, any polychromatic light emitted by any of the sources 52, 68 and 82 is focussed on the entry slit of the corresponding light detection device.

We will now describe an example application of the invention, purely for information purposes and in no way restrictively; we will consider the case of optical emission spectrometry with luminescent discharge applied to the spectrometric analysis of emission lines, for example carbon, hydrogen, oxygen and nitrogen emission lines that are between 120 nm and 160 nm.

The examples given above (FIGS. 6 to 8) may be applied to the case in which the optical system is used to optimise collection of light output from a luminescent discharge cell or lamp (forming the light source) towards an optical wavelength-dispersive spectrometer (forming the detection system).

This type of light source emits polychromatic light for which the rays, after penetrating into the detection system, are dispersed as a function of their wavelengths.

Figure 1:
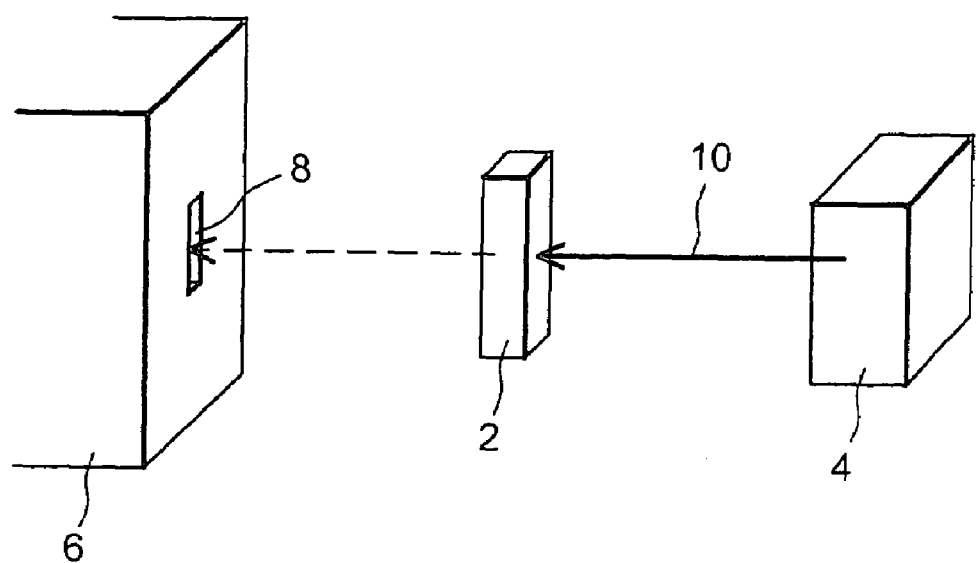
FIG. 1 diagrammatically shows a light collection system placed between a light source and a light detection device, and has already been described, FIG. 2 diagrammatically shows the path of light in the case of a known light transmission system composed of a plate with parallel faces, and has already been described, FIG. 3 diagrammatically shows the path of light in the case of a known light transmission system composed of a biconvex focusing lens, and has already been described, FIG. 4 diagrammatically shows the path of light in the case of a known light transmission system composed of a set of two plane—convex focusing lenses, and has already been described, FIG. 5 diagrammatically shows the partial closing that exists at the entry slit of the detection device in the case of FIGS. 3 and 4 for polychromatic light, and has already been described.
Figure 2:
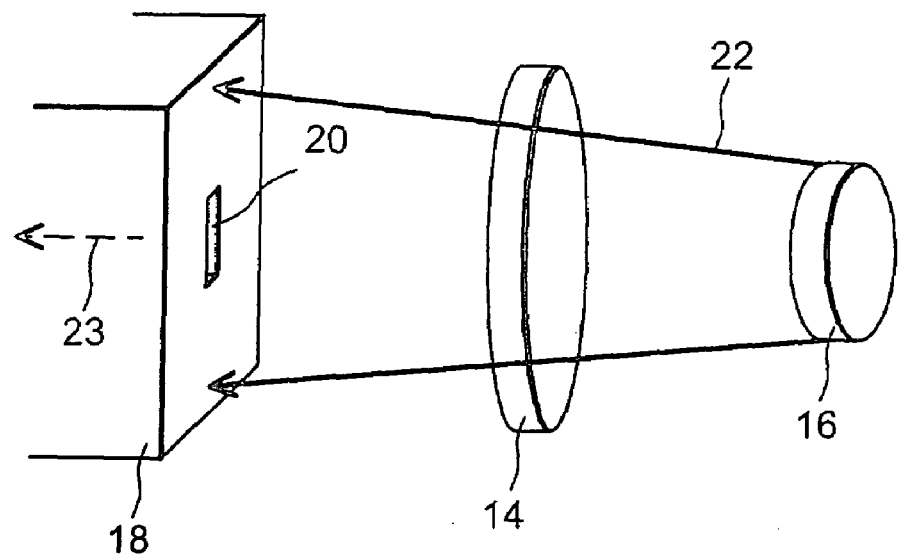
Figure 3:
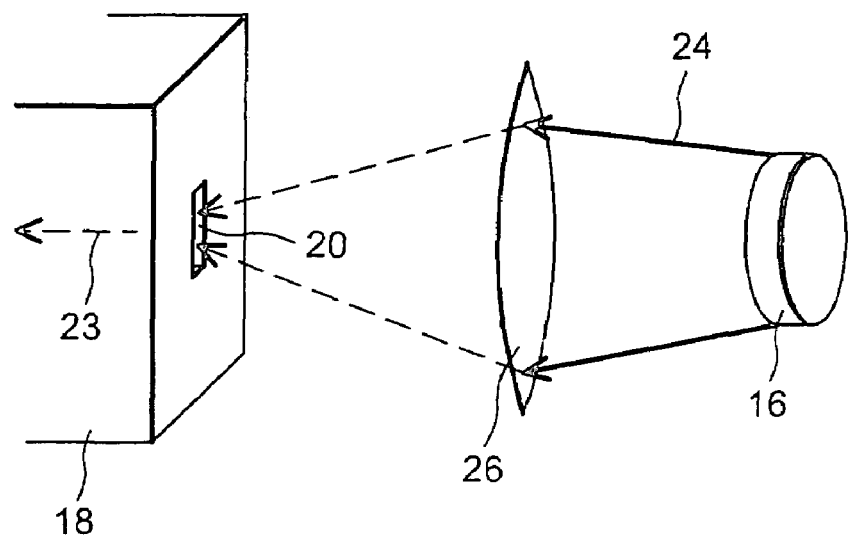
Figure 4:
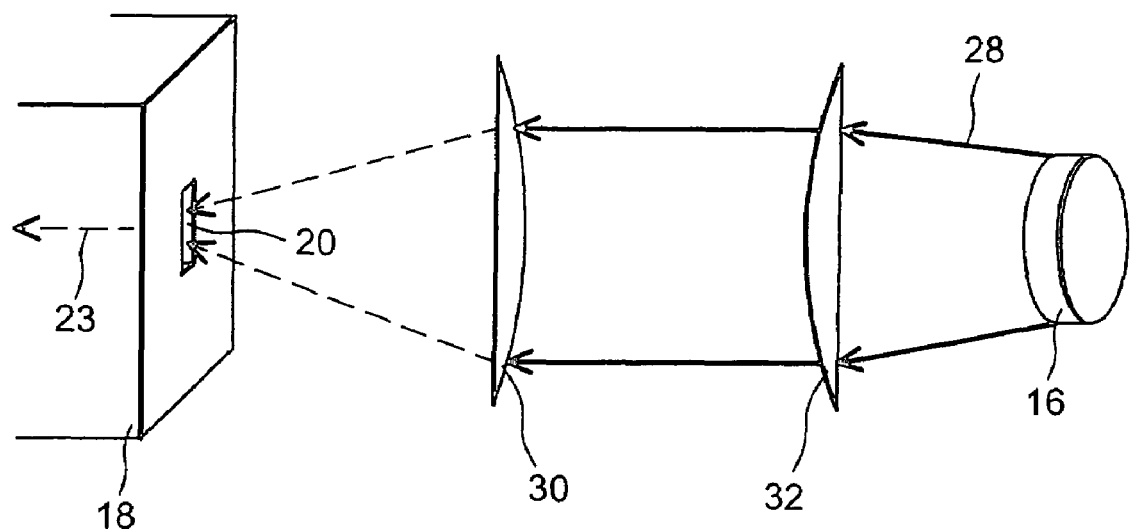
Figure 5:
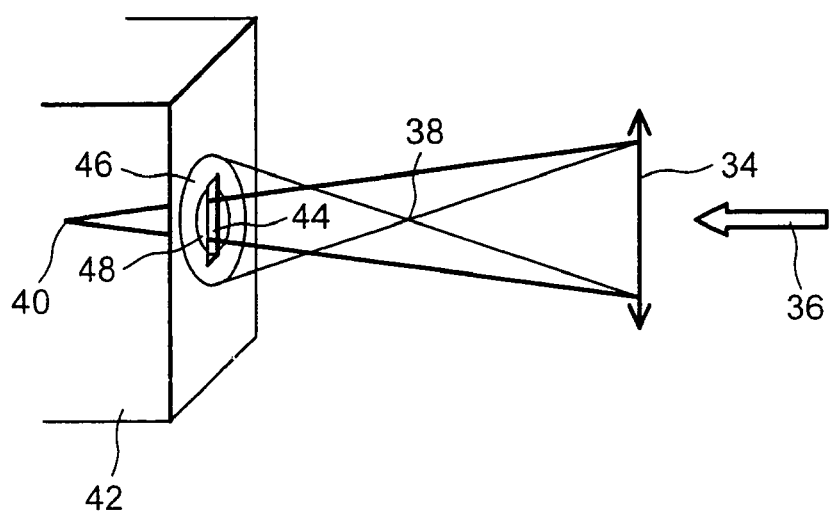
Figure 9:
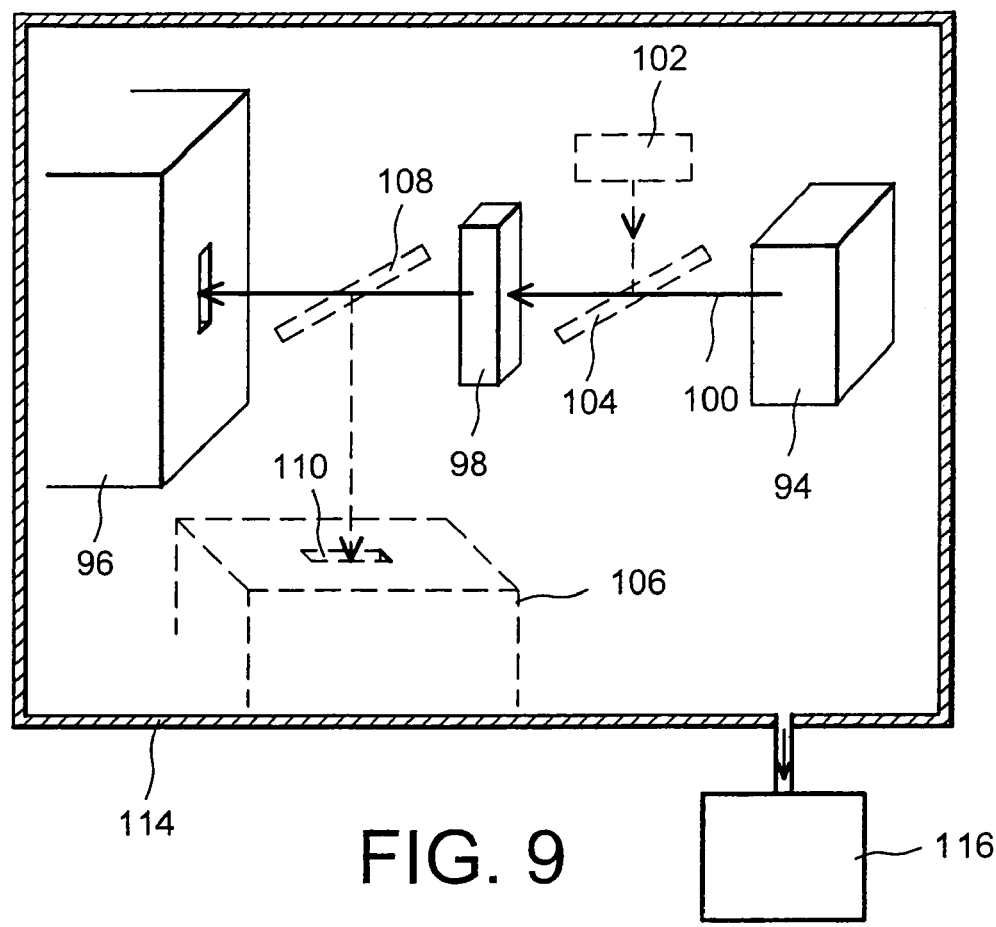

Refer to FIG. 9 which shows a light discharge lamp 94, an optical wavelength-dispersive emission spectrometer 96, and a light collection system 98 with mirrors according to the invention. The path followed by light in the assembly 94-96-98 in FIG. 9 is marked with reference 100.

The use of mirrors makes it possible to amplify the light fluxes and in particular to solve the absorption and chromatic aberration problems mentioned above. The assembly 94-96-98 in FIG. 9 may be used for light with wavelengths of 121.567 nm, 130.217 nm, 149.262 nm and 156.144 nm respectively emitted by hydrogen, oxygen, nitrogen and carbon elements during radiative deexcitation within the luminescent discharge cell.

FIG. 9 diagrammatically illustrates variant embodiments of a system according to the invention: in addition to light output from the source 94, the optical system 98 can process light which is output from another light source 102 and which is forced to follow the same path 100 due to a semi-transparent mirror 104 adapted to the lights considered.

Light(s) output by the optical system 98 can also be treated through a spectrometer 106, in addition to the spectrometer 96.

An appropriate semi-transparent mirror 108 is then provided to transfer light(s) originating from the system 98 onto the slit 110 of the spectrometer 106.

The use of a light collection system according to the invention enables:
- maximising the light flux transmitted from the light source to the detection system by this light collection system (amplification),
- minimising absorption of light rays by the optical elements, and
- focusing all rays with different wavelengths to the same point (achromatism).

The system according to the invention can provide considerable gains in terms of transmitted and collected light flux and in terms of simultaneously observable spectral ranges.

It may be used with any known light detection device.

It is not limited to use in the ultraviolet range of light radiation.

Furthermore, it is not limited to use with a luminescent discharge lamp, but can be used with any light source.

This system is not limited to two mirrors (see the description of FIG. 10).

Furthermore, it is not limited to the use of mirrors with a spherical, parabolic or ellipsoidal shape.

Nor is it limited to spectrometric analysis of the C, H, O and N elements; it is also applicable to the spectrometric analysis of any chemical element.

FIG. 10 shows a variant embodiment of FIG. 6 in which another mirror 112 is used in addition to the mirrors 58 and 60, to reflect light output from the system 50 towards the slit 56 in the device 54.

For example, such an arrangement could be used when the device cannot be placed in line with the source 52.

We will now reconsider the examples in FIGS. 6 to 10.

With detection devices 54, 70 and 84, we may want to study a polychromatic light, particularly a polychromatic light source for which the spectrum contains one or several ultraviolet components. This possibility has already been considered above, particularly in the case in which the source is a luminescent discharge lamp or cell.

In accordance with the invention, a chamber is provided, that is opaque to all light, and particularly ultraviolet radiation, and inside which the source, the detection device and the mirrors are placed, so that the measurements are not disturbed. Means are also provided for creating a vacuum in this chamber, or filling it with a gas transparent to ultraviolet radiation.

This is illustrated diagrammatically in FIG. 6 which shows a chamber 114 that is sealed and is opaque to all light and in which the source 52, the mirrors 58 and 60 and the device 54 are located. This chamber may for example be made of a metal such as stainless steel.

Pumping means 116 are provided to create a vacuum in this chamber, so as to eliminate all gas such as water vapour or dioxygen that could absorb ultraviolet radiation.

The chamber 114 and the pumping means 116 are also shown diagrammatically in FIGS. 9 and 10.

In the example in FIG. 7, these pumping means are replaced by means of filling the chamber 114 with a gas transparent to ultraviolet radiation and for example that does not contain water or dioxygen. For example, pure dinitrogen or a rare gas such as argon could be used.

These means of filling the chamber 114 with gas comprise means 118 of injecting this gas into the chamber. A hole 119, at a distance from the gas inlet location in the chamber, is provided in the wall of this chamber to allow the gas to escape (after which this gas may be pumped by means not shown). The result is then circulation of the gas in the chamber.

In the example shown in FIG. 6, the chamber is rigid. However, a "flexible" chamber could also be used.

This is shown diagrammatically by FIG. 8 in which the chamber is made of several parts; a main chamber 120 is used that contains the mirrors, with an auxiliary chamber 122 that contains the source 82 and that is connected to the chamber 120 in a sealed manner through a metal bellows 124. Furthermore, the detection device 84 is located in a sealed chamber 126 and this chamber is connected in a sealed manner to the chamber 120 through another metal bellows 128.

The device, the mirrors and the source are thus located in a "flexible" chamber due to the bellows. In particular, this makes it possible to move the mirrors to refine focusing settings.

Advantageously, such a "flexible" chamber could also be used in the examples in FIGS. 6, 7, 9 and 10.

In one example of the invention not shown, a rigid chamber is used, for example in the form of a tube containing the source and the mirrors, and this chamber is connected in a sealed manner through a rigid or flexible duct (bellows) to another sealed chamber containing the detection device.

All connections between chambers are obviously made so as to not hinder propagation of light from the source as far as the detection device.

The invention claimed is:

1. Optical light collection system, this system being intended to collect light emitted by at least one light source and to focus the collected light onto at least one light detection device, this system being characterized in that it comprises at least two mirrors, namely a first mirror and a second mirror, and in that the source is a luminescent discharge lamp, the first mirror being capable of collecting light emitted by the light source and making the collected light converge onto the second mirror, this second mirror being capable of making the light that it receives from the first mirror converge onto the light detection device, this system thus amplifying the light flux, being achromatic and having a low absorption for light, including for the ultraviolet radiation, and in that the system is provided with:
    a chamber that is opaque to all light, including ultraviolet radiation, and in which the light source, the light detection device and the mirrors are placed, and
    means of creating a vacuum in this chamber or filling it with a gas that is transparent to ultraviolet radiation,
    wherein the first and second mirrors have the same axis, this same axis forming the optical axis of the system, and the respective focal points of the first and second mirrors are located on this optical axis, and
    wherein the first mirror comprises a central drilling that is capable of allowing light focused by the second mirror to pass towards the light detection device.

2. System according to claim 1, in which each of the first and second mirrors is chosen from among spherical mirrors, parabolic mirrors and ellipsoidal mirrors.

3. System according to claim 1, in which each of the first and second mirrors is covered by a metallic or chemical deposit.

4. System according to claim 1, in which the respective focal points of the first and second mirrors are distinct.

5. System according to claim 1 in which light emitted by the light source contains one or more ultraviolet components.

6. Optical light collection system, this system being intended to collect light emitted by at least one light source and to focus the collected light onto at least one light detection device, this system being characterized in that it comprises at least two mirrors, namely a first mirror and a second mirror, and in that the source is a luminescent discharge lamp, the first mirror being capable of collecting light emitted by the light source and making the collected light converge onto the second mirror, this second mirror being capable of making the light that it receives from the first mirror converge onto the light detection device, this system thus amplifying the light flux, being achromatic and having a low absorption for light, including for the ultraviolet radiation, and in that the system is provided with;
- a chamber that is opaque to all light, including ultraviolet radiation, and in which the light source, the light detection device and the mirrors are placed, and
- means of creating a vacuum in this chamber or filling it with a gas that is transparent to ultraviolet radiation,
- wherein the light detection device comprises an entry slit and the second mirror is designed to focus the light that it receives from the first mirror on this entry slit.

7. System according to claim 6 in which the first and second mirrors have the same axis, this same axis forming the optical axis of the system, and the respective focal points of the first and second mirrors are located on this optical axis.

8. Optical light collection system, this system being intended to collect light emitted by at least one light source and to focus the collected light onto at least one light detection device, this system being characterized in that it comprises at least two mirrors, namely a first mirror and a second mirror, and in that the source is a luminescent discharge lamp, the first mirror being capable of collecting light emitted by the light source and making the collected light converge onto the second mirror, this second mirror being capable of making the light that it receives from the first mirror converge onto the light detection device, this system thus amplifying the light flux, being achromatic and having a low absorption for light, including for the ultraviolet radiation, and in that the system is provided with:
- a chamber that is opaque to all light, including ultraviolet radiation, and in which the light source, the light detection device and the mirrors are placed, and
- means of creating a vacuum in this chamber or filling it with a gas that is transparent to ultraviolet radiation,
- wherein the light detection device is an optical spectrometric analysis device comprising an entry slit and the second mirror is designed to focus light that it receives from the first mirror on this entry slit.

9. Optical light collection system, this system being intended to collect light emitted by at least one light source and to focus the collected light onto at least one light detection device, this system being characterized in that it comprises at least two mirrors, namely a first mirror and a second mirror, and in that the source is a luminescent discharge lamp, the first mirror being capable of collecting light emitted by the light source and making the collected light converge onto the second mirror, this second mirror being capable of making the light that it receives from the first mirror converge onto the light detection device, this system thus amplifying the light flux, being achromatic and having a low absorption for light, including for the ultraviolet radiation, and in that the system is provided with:
- a chamber that is opaque to all light, including ultraviolet radiation, and in which the light source, the light detection device and the mirrors are placed, and
- means of creating a vacuum in this chamber or filling it with a gas that is transparent to ultraviolet radiation,
- further comprising at least one other mirror via which light coming from the second mirror is sent to the light detection device.

10. Optical light collection system, this system being intended to collect light emitted by at least one light source and to focus the collected light onto at least one light detection device), this system being characterized in that it comprises at least two mirrors, namely a first mirror and a second mirror, the first mirror being larger than the second mirror, and in that the source is a luminescent discharge lamp, the first mirror being capable of collecting light emitted by the light source and making the collected light converge onto the second mirror, this second mirror being capable of making the light that it receives from the first mirror converge onto the light detection device, this system thus amplifying the light flux, being achromatic and having a low absorption for light, including for the ultraviolet radiation, and in that the system is provided with:
- a chamber that is opaque to all light, including ultraviolet radiation, and in which the light source, the light detection device and the mirrors are placed, and
- means of creating a vacuum in this chamber or filling it with a gas that is transparent to ultraviolet radiation.

* * * * *